(No Model.) 4 Sheets—Sheet 1.

B. FRANKENFIELD & D. C. JACKSON.
METHOD OF AND APPARATUS FOR REGULATING ELECTRIC MOTORS.

No. 599,932. Patented Mar. 1, 1898.

Witnesses
J. G. Hinkel
E. Ennd Eler

Inventors
Budd Frankenfield
Dugald C. Jackson
by
Attorneys

THE NORRIS PETERS CO., PHOTO-LITHO., WASHINGTON, D. C.

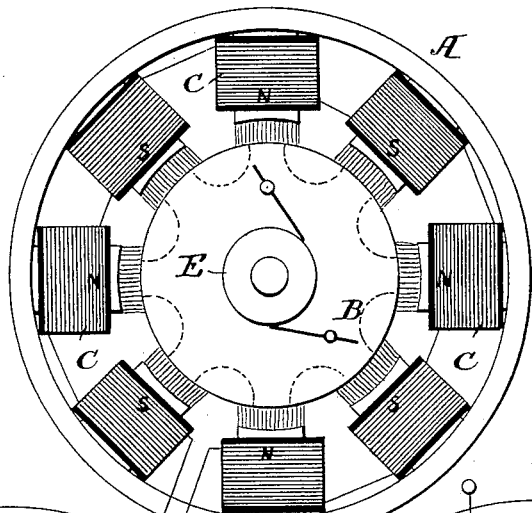
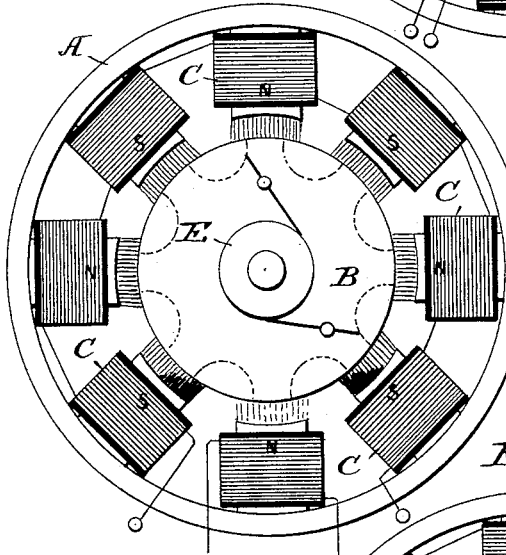
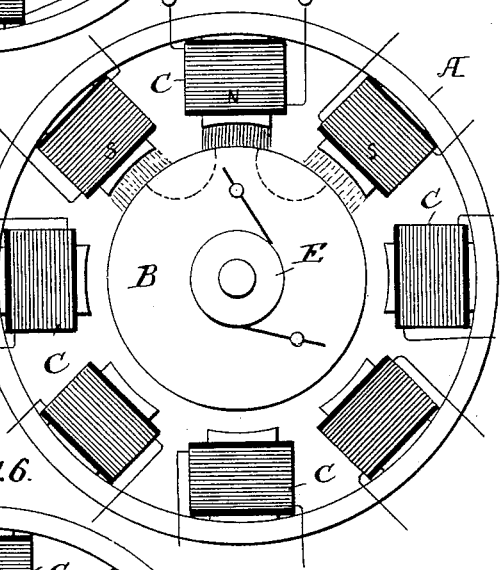
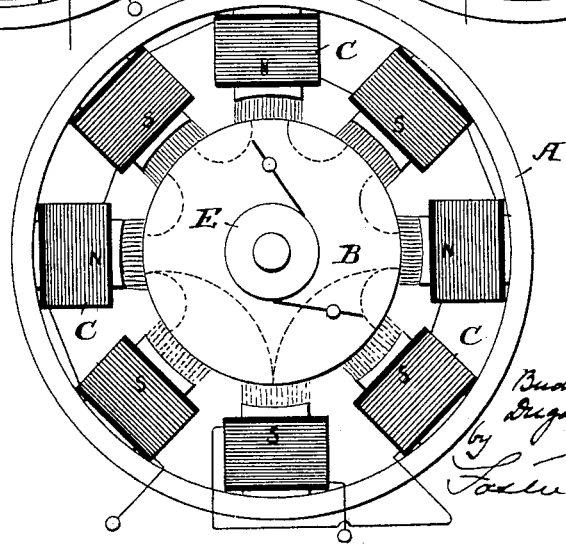

(No Model.) 4 Sheets—Sheet 3.
B. FRANKENFIELD & D. C. JACKSON.
METHOD OF AND APPARATUS FOR REGULATING ELECTRIC MOTORS.
No. 599,932. Patented Mar. 1, 1898.
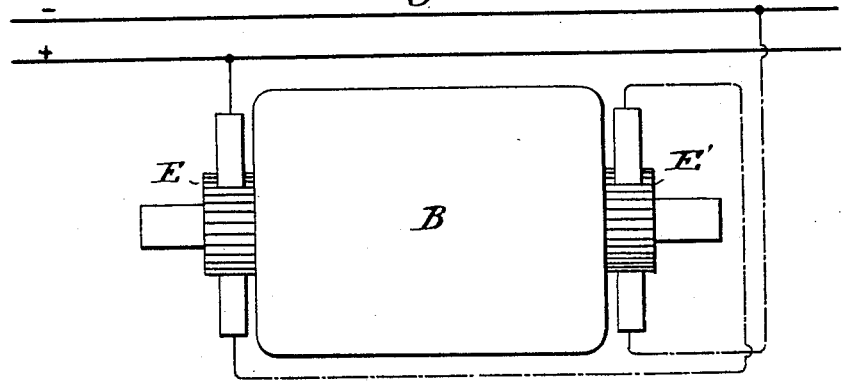
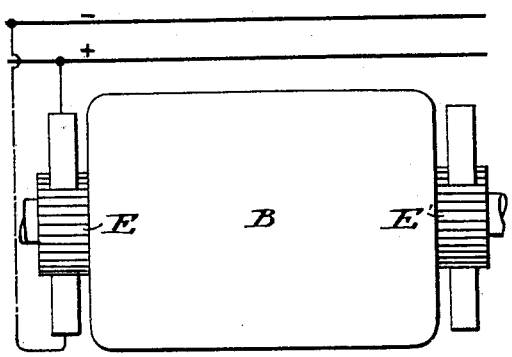 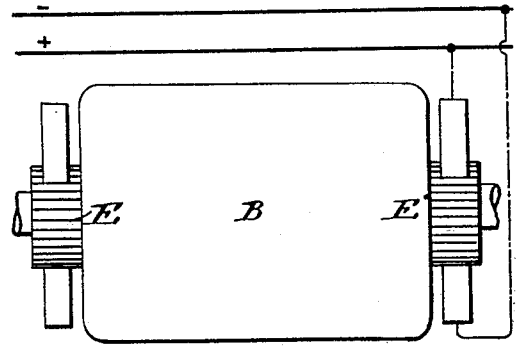
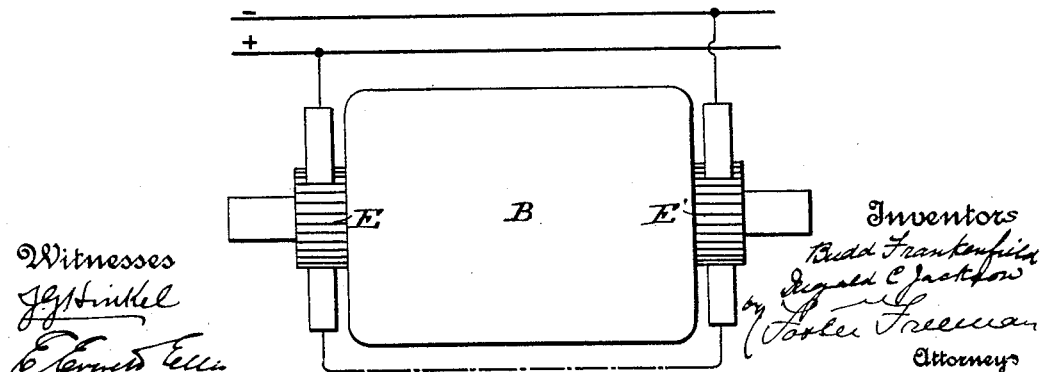

(No Model.) 4 Sheets—Sheet 4.

B. FRANKENFIELD & D. C. JACKSON.
METHOD OF AND APPARATUS FOR REGULATING ELECTRIC MOTORS.

No. 599,932. Patented Mar. 1, 1898.

Witnesses
Inventors
Attorneys

UNITED STATES PATENT OFFICE.

BUDD FRANKENFIELD AND DUGALD C. JACKSON, OF MADISON, WISCONSIN.

METHOD OF AND APPARATUS FOR REGULATING ELECTRIC MOTORS.

SPECIFICATION forming part of Letters Patent No. 599,932, dated March 1, 1898.

Application filed January 28, 1897. Serial No. 621,080. (No model.)

*To all whom it may concern:*

Be it known that we, BUDD FRANKENFIELD and DUGALD C. JACKSON, citizens of the United States, residing at Madison, Dane county, State of Wisconsin, have invented certain new and useful Improvements in Methods of and Apparatus for the Regulation of Electric Motors, of which the following is a specification.

This invention relates to methods of and apparatus for the regulation of electric motors, and has for its object to provide a method of control which shall allow motors to be run sparklessly and with good economy at a great number of different speeds without destroying the property of self-regulation which is inherent in the ordinary shunt-wound motor, but is lost in whole or in part by the ordinary systems of speed control.

The most important methods of speed regulation applicable to a single motor are (*a*) varying the strength of the field-magnets by varying the exciting-current, (*b*) inserting a variable resistance in the armature-circuit, and (*c*) cutting out series coils on the field-magnet, which latter operation varies at once the strength of the field and the resistance in the armature-circuit. In the first of these methods the range of control is very limited, as if the density of the magnetic lines in the pole-pieces be very much weakened the motor will spark excessively owing to the armature reaction, which then becomes very large in proportion to the field magnetism. In practice this method has only been successful where it was desired to vary the speed within narrow limits. The other two methods destroy the self-regulation.

It is well known that an ordinary shunt-wound motor with a very low armature-resistance will run at practically constant speed at all loads. This is a very important property, and it is the object of this invention to produce at will a great number of different speeds without sacrificing this advantage.

Figure 1:
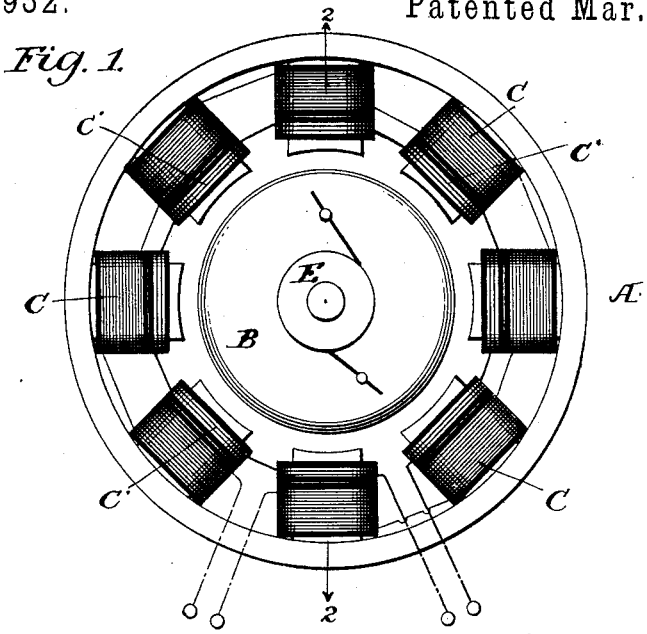
Figure 2:
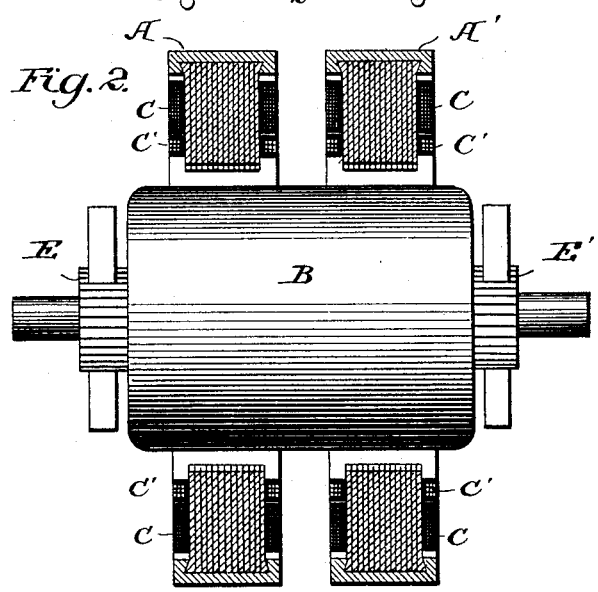
Figure 7:
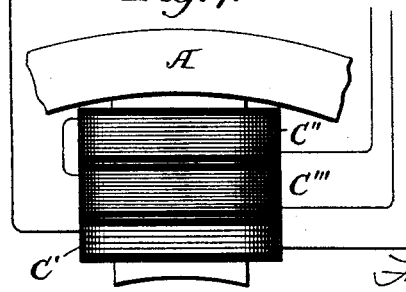
Figure 12:
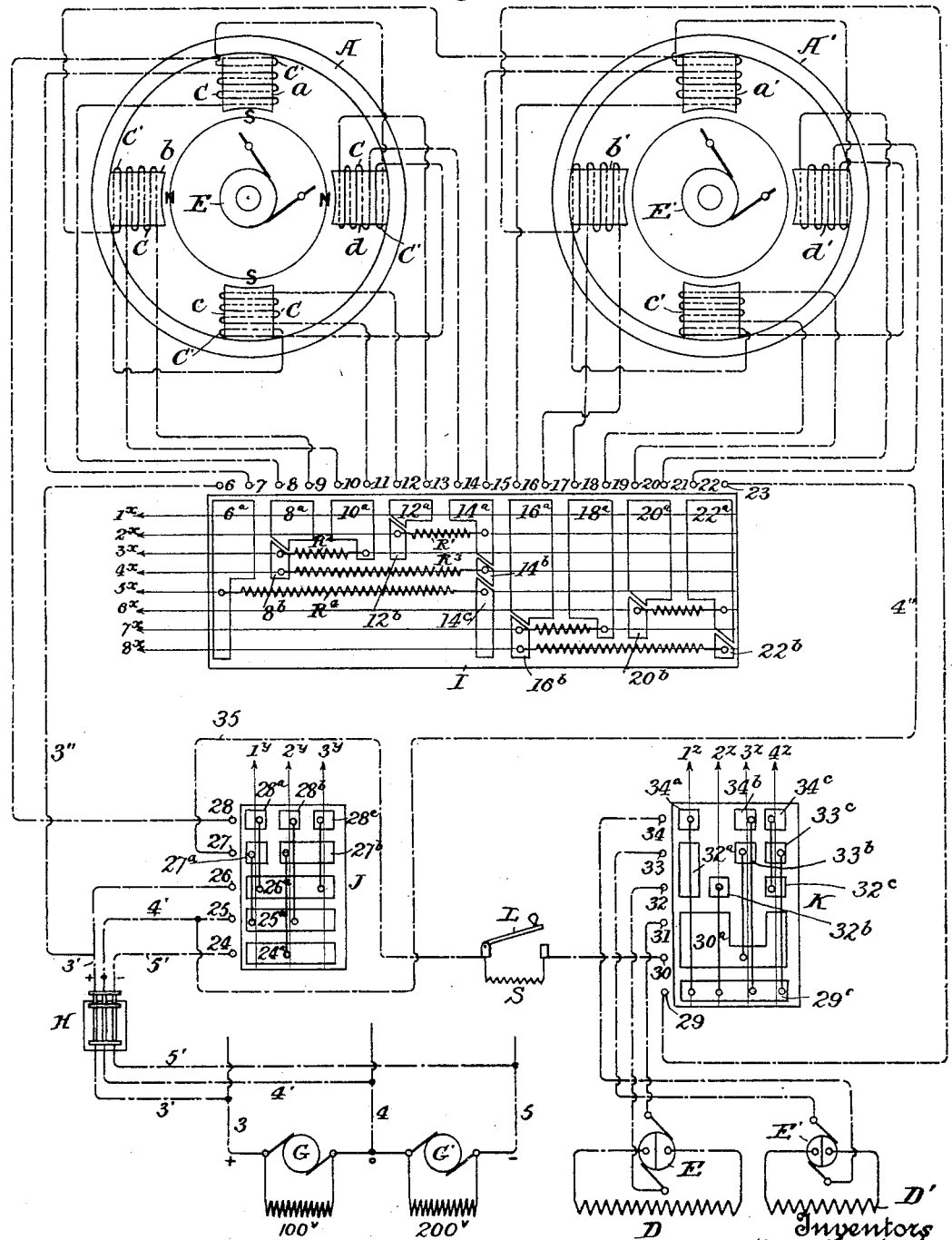

In the drawings attached to this specification, Figure 1 is an end elevation of one form of a motor constructed according to this invention. Fig. 2 is a cross-section on the line 2 2 of Fig. 1. Figs. 3, 4, 5, and 6 are diagrams showing the polar arrangements of an eight-pole motor at different stages of the regulation. Fig. 7 shows one pole-piece of the improved motor in its preferred form with one series coil and two shunt-coils. Figs. 8, 9, 10, and 11 are diagrams showing the construction and connections of the armature-windings at different stages of the regulation. Fig. 12 shows in diagram the improved system of regulation applied to a four-pole motor.

In Figs. 1 and 2, A and A' are the two field-magnet structures, built, preferably, of laminated iron, as usual. B is the armature, of such length that it extends through the two field-magnets, and preferably wound with a two-path or series winding, so that it has only two brushes on the commutator. As will be seen later, it is preferable for many uses to provide a plurality of windings on the armature and a plurality of commutators, as E and E'. C are the shunt field-coils, and C' are the series coils, whose use will be hereinafter explained. If, now, one field-magnet, as A', be cut out entirely, the motor will accelerate to about twice its normal speed and run sparklessly and with good regulation. In some cases this will be sufficient, but in order to procure a finer and at the same time a wider regulation it is preferable to cut out one pole at a time, the effect of which will now be described.

In Figs. 3 to 6 are shown an ordinary eight-pole motor with a two-path winding on the armature. In Fig. 3 all of the field-coils are excited. Suppose, then, that the motor runs at X revolutions per minute. If, now, the excitation of one of the poles be destroyed or neutralized — in other words, if one of the poles be cut out, as shown in Fig. 4—the armature-conductors will theoretically cut seven-eighths as many lines of force as they did before at each revolution, and the motor will tend to run at eight-sevenths X revolutions. If two poles be cut out, the speed will approach four-thirds X, and so on.

In Fig. 5 seven of the poles are inactive, and the speed is theoretically eight X. In practice these theoretical speeds are not fully reached because of the modifying effect of the altered reluctance of the magnetic circuit, &c. In addition the current in the winding on one or more of the poles may be reversed, as shown in Fig. 6. In this case opposing electromotive forces are generated in each of the two paths of the armature and the counter electromotive force is reduced.

In practice it is found ordinarily satisfactory to keep the active poles adjacent to each other (but this depends on the construction of the motor) and to provide on each pole-piece the coils C, which form a series winding, as shown in Figs. 1, 2, and 7. The series winding when kept continuously in the circuit prevents the armature reaction from reversing the poles.

As cutting out one or more pole-pieces reduces the resistance of the field-magnet winding as a whole, it is preferable to replace each winding cut out by a coil so designed that the total resistance of the field-circuit will be constant. The same result may be obtained without the use of external resistances by dividing each of the shunt-windings into two equal coils $C''$ and $C'''$ and cutting out the pole by simply reversing one coil, as shown in Fig. 7. If both of the coils on the same pole-piece be reversed, the sign of the pole is changed. If these shunt-coils are not equal, a differential magnetizing effect will be produced when one coil is reversed. It will be seen that this phase of the invention is shown applied to a motor of the ordinary multipolar type. If now the same system be applied to a motor having a plurality of crowns of pole-pieces, like that shown in Figs. 1 and 2, the range will be still further increased. Either of these two methods will furnish a complete and practical system of motor regulation. For many purposes it is preferred to use the ordinary construction of a multipolar motor rather than one with a plurality of crowns of pole-pieces; but to still further increase the range it is preferred to provide the armature with two windings, preferably wound on one core, and to give one winding a greater number of turns than the other. This is illustrated in Figs. 8 to 12, inclusive. It is preferred to provide the winding D, Fig. 12, with, say, three hundred turns, while the winding $D'$ has two hundred. If now the two windings are connected in series, as shown in Fig. 8, the counter electromotive force at any given speed will be, say, $5x$. If the winding D alone be used, as shown in Fig. 9, it will be $3x$. If $D'$ alone is used, as shown in Fig. 10, it will be $2x$, while in the connections shown in Fig. 11, in which the two windings are in opposition, it will be $3x$ minus $2x$, or $x$. The speeds at these different connections when the armature is connected to a source of constant electric pressure will be then approximately one, five-thirds, five-halves, and five. This invention is not limited to the use of two armature-windings in this manner; but it is found that in practice two are preferable to a greater number. Though this feature of the system of regulation may be used alone in a constant field or in connection with any other system of regulation, it is preferred to combine it with the system shown in Figs. 3 to 7, inclusive, for by such combination a very wide range of speed may be obtained.

The system is illustrated as a whole in Fig. 12. For simplicity a motor is shown having four poles only, though any number of poles may be used, and in order to avoid complicating the drawings a form is shown in which the poles are cut out by simply cutting out the corresponding windings.

G and $G'$ are the generators of a three-wire system, of which 4 is the neutral wire, and 3 and 5 the outside wires. The three-wire system is unsymmetrical—that is to say, the voltage on one side is higher than on the other. For example, G may be a generator of one hundred volts, and $G'$ of two hundred. If the armature be run on the low-tension side—that is, between the leads 3 and 4—it will receive the current due to one hundred volts. If it be run between 4 and 5, it will receive two hundred, while if it be run between 3 and 5 it will receive three hundred. It is preferred to excite the field-magnets from the low-tension side of the system, as it allows them to be wound with coarser wire and makes the motor less expensive for the same efficiency. From the leads 3 4 5 branch wires $3'$ $4'$ $5'$ lead to the motor through the main switch H and the controllers I, J, and K.

A and $A'$ are the two field-magnets, arranged as in Figs. 1 and 2, having the pole-pieces $a$ $b$ $c$ $d$ and $a'$, $b'$, $c'$, $d'$, respectively.

D and $D'$ are the two armature-windings, (indicated diagrammatically only,) shown as connected to the two-part commutators E and $E'$, respectively. In practice the ordinary windings and commutators are used, which are of course more complex.

While it is obvious that some features of this invention may be used with any type of motor-winding whatever, yet in connection with the regulation by cutting out poles it is preferable to use what is known in the art as a "two-path" winding. If such a winding is used, the cutting out of one or more poles will merely affect the total counter electromotive force between the brushes.

The field-magnets, as stated above, are preferably excited from the low-tension side of the system. From the wire $3'$ the branch wire $3''$ leads to the brush 6 of the controller I. These controllers may be of any desired mechanical construction, but are preferably made like an ordinary series-parallel controller.

When the brushes 6 7 8 of the controller I rest on the line $1x$, the current flows from the generator G, by the wire 3, wire $3'$, switch H, wires $3'$ and $3''$, brush 6, segment $6^a$, brush 7, field-magnet pole $a$, brush 8, segment $8^a$, brush 9, pole $b$, brush 10, segment $10^a$, brush 11, pole $c$, brush 12, segment $12^a$, brush 13, pole $d$, brush 14, segment $14^a$, brush 15, pole $a'$, brush 16, segment $16^a$, brush 17, pole $b'$, brush 18, segment $18^a$, brush 19, pole $c'$, brush 20, segment $20^a$, brush 21, pole $d'$, brush 22, segment $22^a$, brush 23, wire $4''$, wire $4'$, switch H, wire 4', and wire 4 to the generator G. It will be seen that at this position all of the shunt-coils are excited and the poles $a\,c\,a'\,c'$ are south, while the poles $b\,d\,b'\,d'$ are north. This then gives the lowest speed and greatest torque and is a suitable starting position. In the position $2x$ the segment $14^a$ bears only on the brush 15, while the brush 12 makes contact with the segment $12^b$. The segments $12^b$ and $14^a$ are connected by a coil R', whose resistance should be equal to that of one shunt-coil. The result is that the shunt-winding on the pole $d$ is cut out of circuit, while the current flowing in the other coils is not affected. The ampere-turns which magnetize the field of the motor will be decreased one-eighth and the speed will rise. It will be noted that the segments of the controller I are shaped so that the field-circuit is never broken in passing from one position to the other. This is advisable on account of the high self-induction of the field-coils. In the same way in the position $3x$ the brush 8 bears on the segment $8^b$, while brushes 9 and 10 are inactive, so that the resistance $R^2$ is substituted for the shunt-coil on $b$. The position $4x$ substitutes the resistance $R^3$ for the coils $b, c$, and $d$, while the position $5x$ cuts out the whole field-magnet A, substituting the resistance $R^4$. The segments at the positions $6x, 7x$, and $8x$ perform on the field-magnet A' the same operations which the positions $1x, 2x$, and $3x$ perform on A, so that in the position $8x$ the shunt-coil on $a'$ only is active, and the motor will tend to run at upward of eight times its original speed. The controller J serves to throw the armature-circuits to either side of the three-wire system or across the outside wires, as preferred. The neutral wire 4 is connected by the wire 4' and switch H to the brush 25. The outside wires 3 and 5 are connected in a similar way to 26 and 24, respectively.

The brushes 27 and 28 may for the present be regarded as the terminals of the armature-circuit. If the brushes rest on the line $1y$, the brush 28 is connected to the positive wire 3' by the segment $28^a$, cross connection, segment $26^a$, and brush 26. Brush 27 is connected to the neutral wire by segment $27^a$, cross connection, and segment $25^a$. This places the armature on the one-hundred-volt side. In the position $2y$, 28 is connected to 4' and 27 to 5', which places the armature on the two-hundred-volt side without reversing the direction of the current. In the position $3y$, 28 is connected to 3'; otherwise the connections are the same. This places the armature across the outside wires of the system, where it receives the current due to the full potential of three hundred volts.

The controller K serves to connect the two unequal armature-windings to the circuit in series, singly, or in opposition, as preferred. The positions $1z\,2z\,3z\,4z$ correspond to Figs. 8, 9, 10, and 11, respectively. In the position $1z$ the current flows from the brush 28 of the controller J, through the series coils C' on the various field-magnet poles to the brush 29, segment $29^a$, cross connection, segment $34^a$, brush 34, commutator E', armature-winding D', commutator E', brush 33, segment $32^a$, brush 32, commutator E, armature-winding D, commutator E, brush 31, segment $30^a$, brush 30, to the brush 27 of the controller J. The effect is to place the two armature-windings in series across the mains, while the controller J determines which particular pair of mains is used. In the position $2z$ the brushes 33 and 34 are inactive and the current flows from $29^a$ directly to brush 32 by segment $32^b$, so that only the armature-winding D is used. In the position $3z$ the brushes 31 and 32 are inactive. The current flows from $29^a$ to $34^b$, brush 34, winding D', brush 33, segment $33^b$, segment $30^a$, and brush 30, as before. The winding D' then runs alone. In the position $4z$ the current enters at $29^a$, as before, but flows by segment $33^c$, brush 33, through the winding D', in a reversed direction, by brush 34, segment $34^c$, segment $32^c$, and brush 32, through the winding D, as before. In this position the two windings on the armature are connected in opposition, and a low counter electromotive force and a high speed result.

In practice it is found advisable to provide a resistance in the armature-circuit which can be cut in when any change is made in any of the switches to prevent any sudden rush of current and cut out when the new speed has been approximately attained. Such a resistance is shown at S in Fig. 12 inserted in the wire 35, which leads from the brush 27 of controller J to the brush 30 of controller K. A simple switch L is shown, so arranged as to short-circuit the resistance when closed. This switch may be actuated either by hand or automatically, as desired.

A particular set of switches is illustrated for carrying out one form of the invention, but any other suitable construction and arrangement may be employed. As shown above, a motor may be used having any number of poles. Any pole may be cut out by reversing half of its winding, and the various features of the regulation may be used independently. Nor is the invention restricted to the use of any particular type of motor; but the improvements may be applied, with suitable modifications obvious to those skilled in the art, to motors of any type whatever. Therefore, without restricting the invention to the particular forms shown and described.

What is claimed is—

1. The method of varying the speed of a multipolar motor, which consists in weakening and strengthening the magnetomotive force due to the coils exciting one or more of the poles, while leaving the magnetomotive force due to the coils exciting one or more of the poles unchanged, substantially as described.

2. The method of changing the speed of an electric motor having two unequal armature-windings, which consists in connecting said windings to the mains in conjunction, and in opposition, substantially as described.

3. The method of changing the speed of an electric motor having a plurality of unequal armature-windings, which consists in connecting said windings to the mains separately, in conjunction, and in opposition, in accordance with the speed desired, substantially as described.

4. The method of varying the speed of an electric motor, which consists in connecting its armature-coils in conjunction, and in opposition, and to either side of an unsymmetrical three-wire system or across the outside wires, and varying the number of active poles on the field-magnets, substantially as described.

5. The combination with a multipolar motor having an armature with fewer paths than poles, of a switch so constructed and arranged as to vary the magnetomotive force due to the windings which excite one or more of the poles, while leaving the windings of one or more of the poles unchanged, substantially as described.

6. The combination with a multipolar motor, of shunt-exciting coils for the field-magnet poles, means for varying the effect of one or more of the shunt-coils, an armature having fewer paths than the field-magnet has poles, and a series winding on the field-magnet adapted to prevent each pole from being reversed when the excitation due to the shunt-coils becomes low, substantially as described.

7. The combination with a multipolar motor, of a two-path armature, and means for cutting out the field-magnet poles separately, substantially as described.

8. In a direct-current electric motor, the combination with a field-magnet, of an armature having two unequal windings connected to separate commutators, and means for connecting said windings in conjunction, and in opposition, substantially as described.

9. In a direct-current electric motor, the combination with a field-magnet, of an armature having two unequal windings, and means for connecting said windings in conjunction, and in opposition, and for using them independently, substantially as described.

10. In an electric motor, the combination of a multipolar field-magnet, with an armature having two unequal windings, means for cutting out one or more of the field-magnet poles, and means for connecting the armature-windings in conjunction, and in opposition, substantially as described.

11. The combination of an unsymmetrical three-wire system, with a motor having a field-magnet and an armature with a plurality of unequal windings, means for connecting the armature-circuit of the motor to either side of the three-wire system, and means for connecting the armature-windings in conjunction, and in opposition, substantially as described.

12. The combination with an unsymmetrical three-wire system, of a multipolar motor having a plurality of unequal armature-windings, means for connecting the terminals of the armature-circuit of the motor to either wire of the three-wire system, means for connecting the armature-windings in conjunction and in opposition, and means for cutting out poles of the field-magnet separately, substantially as described.

In testimony whereof we have signed our names to this specification in the presence of two subscribing witnesses.

BUDD FRANKENFIELD.
DUGALD C. JACKSON.

Witnesses:
MABEL F. JACKSON,
JOSEPHINE H. FOSS.